(12) United States Patent
Antony et al.

(10) Patent No.: US 7,169,424 B2
(45) Date of Patent: Jan. 30, 2007

(54) MOLD INHIBITOR HAVING REDUCED CORROSIVENESS

(75) Inventors: Jesuadimai Ignatius Xavier Antony, Singapore (SG); Goh Swee Keng, Singapore (SG); Hai Meng Tan, Singapore (SG)

(73) Assignee: Kemin Industries, Inc., Des Moines, IA (US)

( * ) Notice: Subject to any disclaimer, the term of this patent is extended or adjusted under 35 U.S.C. 154(b) by 12 days.

(21) Appl. No.: 10/737,099

(22) Filed: Dec. 16, 2003

(65) Prior Publication Data

US 2004/0170729 A1    Sep. 2, 2004

Related U.S. Application Data

(60) Provisional application No. 60/451,299, filed on Feb. 28, 2003.

(51) Int. Cl.
  *A23B 9/26* (2006.01)
  *A23K 3/00* (2006.01)
  *A23L 3/3463* (2006.01)

(52) U.S. Cl. ...................... 426/335; 426/532

(58) Field of Classification Search ............... 426/321, 426/331, 442, 310, 309, 335, 532
See application file for complete search history.

(56) References Cited

U.S. PATENT DOCUMENTS

| 4,770,878 | A |   | 9/1988  | Thomas |          |
|-----------|---|---|---------|--------|----------|
| 4,806,353 | A |   | 2/1989  | Thomas |          |
| 4,847,067 | A | * | 7/1989  | Thomas | 424/639  |
| 4,963,366 | A |   | 10/1990 | Thomas |          |
| 6,183,794 | B1 |   | 2/2001  | Kaesler |         |
| 6,294,186 | B1 | * | 9/2001  | Beerse et al. | 424/405 |
| 6,461,622 | B2 | * | 10/2002 | Liu et al. | 424/401 |
| 2003/0194454 | A1 | * | 10/2003 | Bessette et al. | 424/745 |

OTHER PUBLICATIONS

Sofos, J.N., Antimicrobial Agents in "Food Additive Toxicology" Eds., Joseph A. Maga and Anthony T. Tu, Marcel Dekker, Inc., 1994.
Dixon, R.C. & Hamilton, P.B., "Effectof Feed Ingredients on the Antifunal Activity of Propionic Acid", Poultry Science, pp. 60 & 2407-2411, 1981.
Peris, S. & Asensio, J.J., "Organic Acids Plus Botanicals", Feed International, pp. 17-19, Mar. 2002.
Sinha, K.K., Sinha, A.K., & Prasad, G., "The Effect of Clove and cinnamon oils on growth of an aflatoxin production by aspergillus flavus", Letters in Applied Microbiology, 16 & 114-117, Sep. 1993.
Mahmoud, A., "Antifungal action and antiaflatoxigenic properties of some essential oil constitutents", Letters in Applied Microbiology, 19 & 110-113, Mar. 1994.
Hili, P., Evans, C.S., & Veness, R.G., "Antimicrobial action of essential oils: the effect of dimehtylsulphoxide on the activity of cinnamon oil", Letters in Applied Microbiology, 19 & 110-113, Aug. 1997.

* cited by examiner

*Primary Examiner*—Arthur L. Corbin
(74) *Attorney, Agent, or Firm*—Kent A. Herink; Daniel A. Rosenberg; Emily E. Harris

(57) ABSTRACT

A mold inhibitor is described which is a combination of a salt of propionic acid and an essential oil. The essential oil is selected from the group that includes but is not limited to cinnamon oil, eucalyptus oil, lemongrass oil, palmrosa oil, rosemary oil, sage oil, cassia oil, and thyme oil. The essential oil of cinnamon bark (*Cinnamomum zeylanicum*) has a synergistic effect with propionic acid in mold inhibition. The new mold inhibitors have improved efficacy, are less corrosive and are cost effective.

18 Claims, 3 Drawing Sheets

Relative volatility of mould inhibitor formulation with and without cinnamon oil

MOLD INHIBITOR HAVING REDUCED CORROSIVENESS

This application claims priority to U.S. Patent Application Ser. No. 60/451,299, filed Feb. 28, 2003.

BACKGROUND OF THE INVENTION

The invention relates generally to mold inhibitors and, more specifically to a mold inhibitor containing propionic acid to which an essential oil has been added to reduce its corrosiveness and improve its efficacy.

Grains and grain products can develop molds that produce mycotoxin compounds either prior to harvest or while in storage. High moisture content in the grains or grain products, particularly including animal feeds, promotes the development of mold and mycotoxin production. Mold inhibitors can be added to feeds to inhibit this development. Of all the mold inhibitors currently available at an economical price, propionic acid is the most efficacious. This acid is Generally Recognized as Safe (GRAS) by FDA, available in liquid or dry formulations, of low toxicity to animals, and economical for addition to feeds at an effective level. While the use of propionic acid-based mold inhibitors has become widespread in many countries, it is well recognized that feed mill managers are very sensitive to corrosive problems associated with the usage of mold inhibitors that are sprayed on to their feeds for non-nutritional purposes. There is a need, accordingly, for a less corrosive efficacious mold inhibitor.

The main types of mold inhibitors are based on organic acids. The most effective liquid mold inhibitors are based on propionic acid (Dixon, R. C. and Hamilton, P. B., (1981), Effect of Feed Ingredients on the Antifungal Activity of Propionic Acid, Poultry Science, 60, 2407–2411; Sofos, J. N., (1994) "Antimicrobial Agents in "Food Additive Toxicology", Eds, Joseph A. Maga and Anthony T. Tu., Marcel Dekker, Inc. New York, USA). These formulations are made using either free propionic acid or salts of propionic acid. In addition, there are mold inhibitor formulations existing with propionic acid in combination with other ingredients, including the formulations in U.S. Pat. Nos. 4,770,878; 4,806,353; 4,847,067; 4,963,366; and 6,183,794 B1.

Recently it has been proved that essential oils showed marked activity against some Gram-positive and Gram-negative bacteria and yeast (Hili, P, Evans, C. S., and Veness, R. G., (1997), Antimicrobial Action of Essential Oils: The Effect of Dimethylsulphoxide on the Activity of Cinnamon Oil, Letters in Applied Microbilogy, 24, pp 269–275). The antimicrobial activity was greater if the essential oil contained geraniol (Cruz, u., Cabo, M. M., Castillo, M. J., Jimenez, J., Ruiz, C., and Ramos-Cormenzana, A., (1993), Chemical Composition and Antimicrobial Activity of Essential Oils of Different Samples of *Thymus Bacticus* Boiss, Phytotherapy Research, 7, pp 92–94). Essential oils are the odorous, volatile products of plants. The function of essential oils is believed to be largely communicative and a variety of complex interactions have evolved enabling plants to utilize essential oils to influence their environment.

SUMMARY OF THE INVENTION

The present invention is a mold inhibitor which uses salts of propionic acid in combination with one or more essential oils. The salt is preferably the sodium, ammonium, or calcium salt of propionic acid. The essential oils are selected from the group that includes but is not limited to cinnamon oil, eucalyptus oil, lemongrass oil, palmrosa oil, rosemary oil, sage oil, cassia oil, and thyme oil. In certain embodiments, essential oils which contain significant amounts of geraniol are used. The essential oil of cinnamon bark (*Cinnamomum zeylanicum*) has a synergistic effect with propionic acid in mold inhibition. The mold inhibitor may be either a dry composition or an aqueous solution. The new mold inhibitors have improved efficacy, are less corrosive and can be equally cost effective.

In preferred embodiments, the mold inhibitors include between about 50% and about 80% propionic acid, between about 1% and about 20% of an alkali metal base, and between about 0.01% and about 10% essential oil. The mold inhibitors of the present invention are applied generally in amounts comparable to known mold inhibitors having similar formulations but not including an essential oil.

In alternative embodiments of the invention, a deliquescent agent is added to the composition. In additional alternative embodiments of the invention, a surfactant is added to the composition.

An object of the present invention is to provide a propionic acid-based mold inhibitor which includes one or more essential oils.

Another object of the present invention is to provide a mold inhibitor with improved efficacy.

A further object of the present invention is to provide a mold inhibitor with reduced corrosiveness.

These and other objects of the invention will be understood by those skilled in the art upon a review of this specification, the associated drawings and the appended claims.

DETAILED DESCRIPTION OF THE PREFERRED EMBODIMENTS

Figure 1:
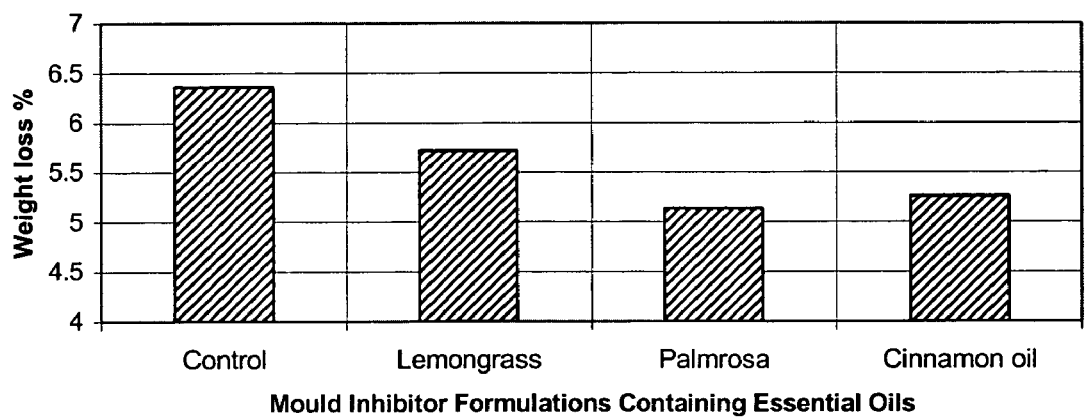
FIG. 1 is a chart that compares the corrosive properties of mold inhibitors made with essential oils compared to a formulation without essential oil.

The use of mold inhibitors in the animal feed industry has become widespread, especially within the poultry sector. Reasons for the use of these products include the prevention of protein and vitamin loss as well as loss of energy through mold activity. In addition, prevention of mold growth protects feed from the formation of mycotoxins that are known to have a variety of ill effects in animal husbandry. Feed moisture content, ambient temperature, relative humidity, storage time, exposure to mold contamination, feed substrate and mold type influence the incidence of mold growth and mycotoxin production. The routine inclusion of an effective mold inhibitor in the animal feed is a cost effective and convenient method of ensuring that mold growth is controlled and the risk of mycotoxins is reduced.

Essential oils are the volatile, aromatic oils obtained by steam or hydro-distillation of botanicals. Most essential oils are primarily composed of terpenes and their oxygenated derivatives. Different parts of the plants can be used to obtain essential oils, including the flowers, leaves, seeds, roots, stems, bark, and wood. Certain cold-pressed oils, such as the oils from various citrus peels, are also considered to be essential oils. Other aromatic, plant-derived oils included under the term essential oils include oils obtained by solvent extraction, such as extraction by hexane, ethanol, acetone, and other hydrocarbons, extraction by supercritical carbon dioxide, and extraction by fluorohydrocarbons, such as tetrafluoroethane.

Deliquescent agents have a strong affinity for water and will absorb it from the atmosphere. Suitable deliquescent agents for use in formulations of the present invention include salts that are safe for animal consumption. A preferred salt is calcium chloride.

A surfactant my be included in the composition to adjust its physical characteristics. Suitable surfactants for use in formulations of the present invention include surfactants that are safe for animal consumption and have hydrophilic-lipophilic balance (HLB) value of between about 4 and 18. Preferred surfactants include propylene glycol and Tween 80.

In addition to propionic acid, the formulations may preferably include other organic acids, such as acetic, benzoic, butyric, formic, pthalic, salicylic, and valeric acids, and/or salts of such organic acids.

The formulation of the mold inhibitors of the present invention includes salts of propionic acid, propionic acid, or both, in combination with an essential oil. The formulations may also include water, a surfactant or mixture of surfactants, additional organic acids or salts of organic acids or both, and a deliquescent agent. Formulations based on these ingredients that exhibit the anti-mold activity with reduced corrosiveness will comprise between about 50% and 80% propionic acid; between about 0% and 30% of a metal salt, preferably sodium, calcium or ammonium hydroxide; between 0% and 10% water; between 0% and 5% surfactant, between about 0% and about 1% of a deliquescent agent, and between about 0.01% to 10% essential oil.

EXPERIMENTS

All chemicals and reagents used were of analytical grade or technical grade.

Specifications of the Cinnamon Oil

The cinnamon oil used in the experiments was hydro-distilled oil from the bark of cinnamon tree. The physical and chemical properties of the cinnamon oil are:

| | |
|---|---|
| Specific gravity at 25° C. | 1.010–1.030 |
| Refractive index at 20° C. | 1.5730–1.5910 |
| Optical Rotation at 25° C. | 0° to −2° |
| Cinnamic aldehyde content | more than 70% |
| Solubility | soluble in alcohol |

I. Corrosiveness Tests

Metal corrosion is the surface wastage that occurs when metals are exposed to reactive environments. Metals and alloys do not respond alike to all the influencing factors involved in corrosion. Consequently, it is impractical to establish any universal standard laboratory procedure for corrosion testing. However, there are few methods available which are relatively repeatable and reproducible. One such method has been used in this current investigation. This method is based on the ASTM method (ASTM method reference G31-72, Standard practice for laboratory immersion corrosion testing of metals). This method was improved further. Both the versions are presented in this specification.

A. Methods

1. Corrosiveness Test by Partial Immersion (Method 1)

Galvanized iron strips with the dimension 3.5 cm by 7 cm were used in all the tests. These strips were procured from M/s Scientific Technical Supplies Pte Ltd, Singapore. The specification of the strips was galvanized metal hot-dipped JIS G33022 Z22 (SGCC). The metal strips were washed carefully with detergent and rinsed ten times with tap water and five times de-ionized water to remove dirt and grease. The bottles and strips were dried in an oven at 105° C. for two hours. The strips were then cooled in a desiccator. Each test strip was weighed and then immersed 3.5 cm deep into approximately 66 g of mold inhibitor in a 175 ml dried glass bottle. All the bottles were incubated at 65° C. for 11 days. After 11 days these strips were carefully removed from the bottles without disturbing the rusted metal surface. The strips were cleaned using ultra-sonication (Leo-150, Acoustical Technologies (S) P/L) for 1 hour. The metal strips were then washed again as described above. The loss in metal strip weights was then measured.

2. Corrosiveness Test by Partial Immersion (Method II)

In this modified method an additional step of acetone washing was included after washing the strips with the de-ionized water. The strips were washed with technical grade acetone before and after the corrosion. The remaining steps were the same as the previous method.

B. Parameters Studied

Several experiments were done to study the effect on corrosion of the inclusion of one or more surfactants, the inclusion of a deliquescent agent, and the use of different metal ions.

Several experimental formulations were made by varying the concentration of the actives within these parameters and their corrosive properties were measured.

Discussion

Propionic acid-based mold inhibitors are considered to be corrosive. The degree of corrosion is directly proportional to the free propionic acid concentration in the formulations. Therefore formulating a mold inhibitor requires controlling the balance between mold inhibition and corrosion, both of which are influenced by pH. The pH of free propionic acid is less than 2 making the free acid highly corrosive compared to its salts. In order to address this issue a combination of sodium and ammonium salts of propionic acid was optimized from the above experimental study and included in the preferred formulations. A mixture of propylene glycol and polysorbate or Tween 80 (poly(oxyethelyne)(20)-sorbitane monooleate), was found to be a preferred surfactant mixture. The other ingredients evaluated were water, a variety of essential oils, a variety of organic acids, and calcium chloride.

Effect of Essential Oil on Corrosion

The use of essential oils as antimicrobial agents has been reported widely in the scientific literature. The concentration of the cinnamon oil was 0.1% in the formulation. In addition, formulations were prepared using 0.1% lemongrass oil and 0.1% palmrosa oil. Table 1 and FIG. 1 show the comparison of four formulations. It can be seen that the addition of essential oils reduces the corrosion.

TABLE 1

Effect of essential oils on corrosion.

| Formulation | % Weight loss* |
| --- | --- |
| Control formulation with - 65% propionic acid and no essential oil | 6.36 |
| Formulation with 0.1% lemongrass oil; 65% propionic acid | 5.72 |
| Formulation with 0.1% palmrosa oil; 65% propionic acid | 5.13 |
| Formulation with 0.1% cinnamon oil; 65% propionic acid | 5.23 |

*Average of two replicates

Qualified Formulations for Final Evaluation

From the results of the experiments conducted to study the above parameters, four formulations were finalized for a study on corrosion and mold inhibition properties. The concentration of propionic acid, sodium hydroxide and water were varied between 65% and 75%, 3.8% and 7.6% and 3.8% and 11.95% respectively. The physical and chemical properties of these four formulations are listed in Table 2.

TABLE 2

Physical and Chemical Properties of finalized formulations

| | Finalized Formulations | | | |
| --- | --- | --- | --- | --- |
| Properties | 1 | 2 | 3 | 4 |
| pH | 5.19 | 5.23 | 5.79 | 5.90 |
| Moisture* | 26.15 | 27.25 | 21.13 | 24.34 |
| Color | Yellow | Yellow | Orange | Golden orange |
| Odor | Acidic & Cinnamon | Acidic & Cinnamon | Acidic & Cinnamon | Acidic & Sweet Cinnamon |

*Moisture content was measured using the Karl Fisher titration method

All four formulations were subjected to the corrosion test by the partial immersion method (Corrosion test method II).

The results are presented in Table 3 (average of three experiments).

TABLE 3

Corrosion Test Results for Formulations 1 to 4

| Mold Inhibitor | % Galvanized metal weight loss due to exposure to liquid mold inhibitor | Standard Deviation |
| --- | --- | --- |
| Formulation 1 | 9.09 | 0.20 |
| Formulation 2 | 8.30 | 0.13 |
| Formulation 3 | 6.56 | 0.59 |
| Formulation 4 | 5.94 | 0.37 |

From these results it is evident that Formulation 4 is the best formulation in terms of corrosiveness. Visual observations of the samples are reported in Table 4.

TABLE 4

Visual observations of corrosion test

| | Formulation | Observation |
| --- | --- | --- |
| After 11-day corrosion test; galvanized metal strip | 1 | No sediment |
| | 2 | No sediment |
| | 3 | No sediment |
| | 4 | No sediment |
| After 2-day corrosion test; soft metal nail (20% water added) | 4 | sediment; color of solution unchanged |

II. Experiment 2: Efficacy of Mold Inhibitor by Carbon Dioxide Production

A. Methods

Field corn samples and feed samples were used for the tests. 150 g of corn or feed sample was taken in a transparent plastic bag and the moisture content adjusted to 16% (w/w). The mold inhibitor was added to the sample at a dosage equivalent to 1 kg/T of feed. The sample was then mixed thoroughly. A sample, free of mould inhibitor, was used as the control. Samples were transferred into sterile 500 ml plastic bottles. Each container was covered with the push-in seal and the silicon tubing clamped with a Hoffman clip. The containers were incubated at 25° C. The carbon dioxide concentration in the headspace was measured every 2 days using a Gasminder carbon dioxide detector.

B. Results

Figure 2:
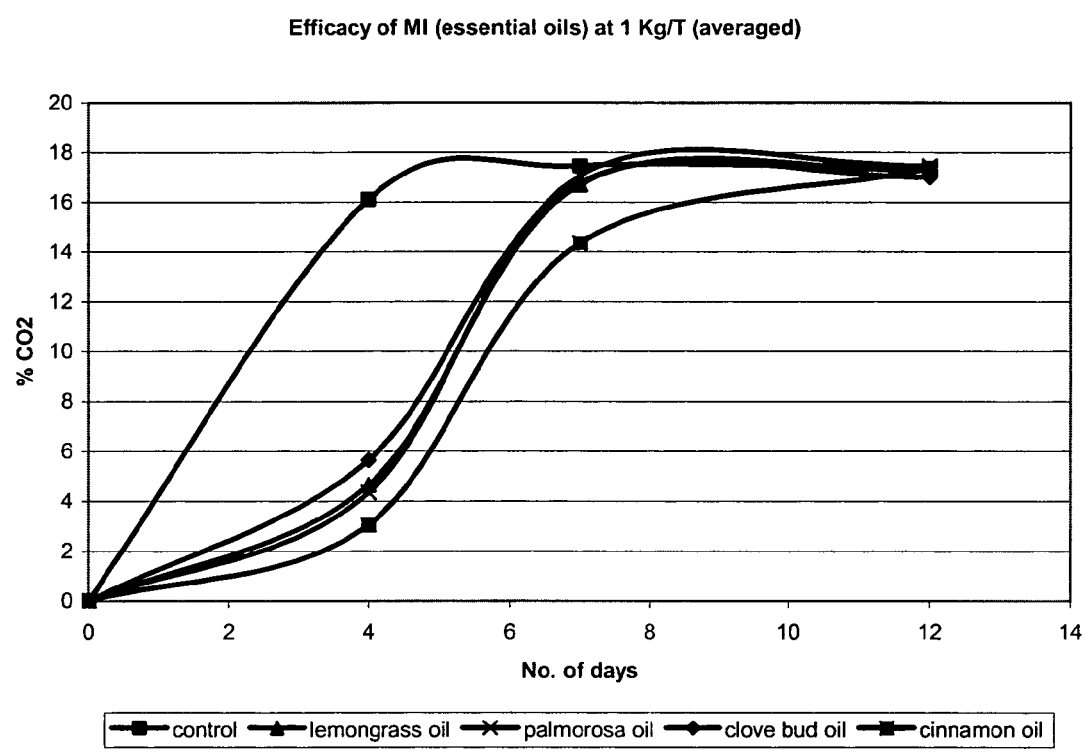
FIG. 2 is a chart that shows the efficacy of mold inhibitors containing lemongrass oil, palmrosa oil, and cinnamon oil at dosage level of 1 kg/T compared to a untreated corn sample; corn with moisture content of 16% was treated with 0.1% mold inhibitors and the % carbon dioxide was measured at two days time interval for 12 days.

Experimental formulations with 0.1% of essential oil were prepared and subjected to the carbon dioxide test to compare the efficacy of these formulations in mold inhibition. The essential oils used in these formulations were cinnamon oil, lemongrass oil, clove bud oil and palmrosa oil. A control sample was also included in the test that was not treated with any mold inhibitor. The test results are presented in FIG. 2.

Figure 3:
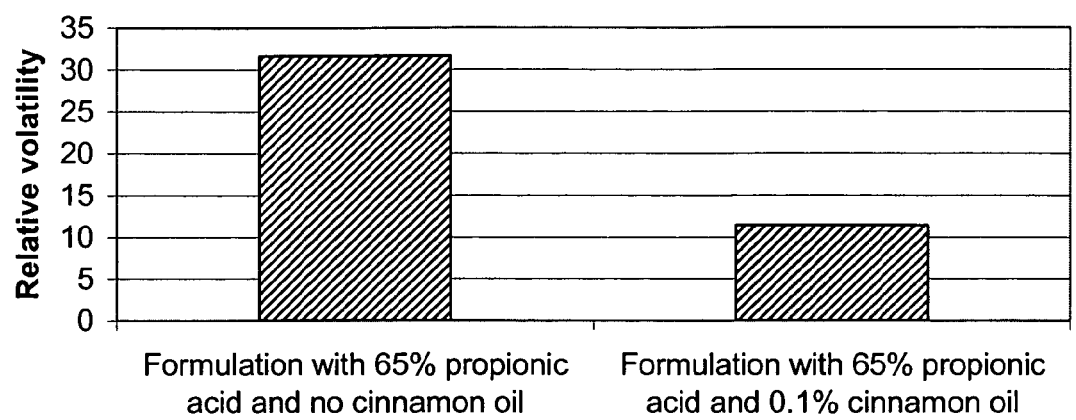
FIG. 3 is a chart that shows the relationship between % relative volatility and % propionic acid, wherein the addition of 0.1% cinnamon oil to 65% propionic acid is shown to reduce the volatility of the resultant formulation.

Propionic acid is a volatile liquid. The relative volatility of propionic acid in the research formulations containing varying concentrations of the acid was measured. The results presented in FIG. 3 show that the addition of 0.1% cinnamon oil to 65% propionic acid reduced the relative volatility of the propionic acid from 31% to 11%. This is an added benefit of the mold inhibitor since the presence of cinnamon oil makes the propionic acid less volatile thus further enhancing the mold inhibiting property of the formulation.

The foregoing description comprises illustrative embodiments of the present inventions. The foregoing embodiments and the methods described herein may vary based on the ability, experience, and preference of those skilled in the art. Merely listing the steps of the method in a certain order does not necessarily constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A mold inhibitor composition of reduced corrosiveness useful for inhibiting mold growth in animal feed comprising propionic acid; an alkali metal base; and an essential oil present in an amount sufficient to reduce the volatility of the propionic acid and to reduce the corrosiveness of the mold inhibitor composition.

2. The mold inhibitor of claim 1, wherein the essential oil is selected from the group consisting of lemongrass oil, palmrosa oil, clove oil, cinnamon oil, eucalyptus oil, rosemary oil, sage oil, thyme oil, and cassia oil.

3. The mold inhibitor of claim 2, wherein the essential oil is synthetic.

4. The mold inhibitor of claim 2, wherein the essential oil is natural.

5. The mold inhibitor of claim 1, comprising between about 50% and about 80% by weight propionic acid, between about 5% and about 30% by weight alkali salt, and between about 0.01% and about 10% by weight of the essential oil.

6. The mold inhibitor of claim 1, wherein the essential oil is selected from the group consisting of lemongrass oil, palmrosa oil, clove oil, cinnamon oil, eucalyptus oil, rosemary oil, sage oil, thyme oil, and cassia oil.

7. A mold inhibitor composition useful for inhibiting mold growth in animal feed, comprising in aqueous solution:
    (a) an organic acid;
    (b) an alkali metal base;
    (c) a surfactant;
    (d) a deliquescent agent; and
    (e) an essential oil present in an amount sufficient to reduce the volatility of the organic acid and to reduce the corrosiveness of the mold inhibitor composition.

8. The mold inhibitor of claim 7, wherein the organic acid component comprises at least two organic acids selected from the group consisting of formic acid, acetic acid, propionic acid, butyric acid, valeric acid, benzoic acid, pthalic acid, and salicylic acid.

9. The mold inhibitor of claim 7 wherein the essential oil contains geraniol.

10. The mold inhibitor of claim 7, wherein the an essential oil is selected from the group consisting of lemongrass oil, palmrosa oil, clove oil, cinnamon oil, eucalyptus oil, rosemary oil, sage oil, thyme oil, and cassia oil.

11. The mold inhibitor of claim 7, wherein the surfactant has a Hydrophylic-Lipophylic Balance value between 4 and 18.

12. The mold inhibitor of claim 11 wherein the surfactants are selected from the group consisting of propylene glycol and poly(oxyethelyne)(20)-sorbitane monooleate.

13. The mold inhibitor of claim 7, wherein the deliquescent agent is selected from the group consisting of calcium chloride, magnesium chloride, ferric chloride, and zinc chloride.

14. The mold inhibitor of claim 7, wherein the essential oil contains either camphene or beta-caryophyllene, or both.

15. The mold inhibitor of claim 7, wherein the essential oil contains geraniol.

16. The mold inhibitor of claim 7, wherein the essential oil contains either camphene or beta-caryophyllene, or both.

17. The mold inhibitor of claim 7, wherein the essential oil is selected from the group consisting of lemongrass oil, palmrosa oil, clove oil, cinnamon oil, eucalyptus oil, rosemary oil, sage oil, thyme oil, and cassia oil.

18. A method of inhibiting mold growth in grain, comprising the step of applying to the grain a mold inhibitor composition comprising propionic acid, an alkali metal base and an essential oil present in an amount sufficient to reduce the volatility of the propionic acid and to reduce the corrosiveness of the composition.

* * * * *